United States Patent
Eisele et al.

(10) Patent No.: US 7,945,365 B2
(45) Date of Patent: May 17, 2011

(54) METHOD FOR INFLUENCING AN AUTOMATIC GEARBOX, TAKING INTO CONSIDERATION THE TRACTIONAL RESISTANCE

(75) Inventors: Markus Eisele, Friedrichshafen (DE); Harry Nolzen, Tettnang (DE); Jürgen Blaser, Meckenbeuren (DE); Harm Adams, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 537 days.

(21) Appl. No.: 12/065,539

(22) PCT Filed: Sep. 30, 2006

(86) PCT No.: PCT/EP2006/009514
§ 371 (c)(1),
(2), (4) Date: Mar. 3, 2008

(87) PCT Pub. No.: WO2007/045344
PCT Pub. Date: Apr. 26, 2007

(65) Prior Publication Data
US 2008/0201047 A1    Aug. 21, 2008

(30) Foreign Application Priority Data
Oct. 18, 2005  (DE) .................. 10 2005 049 710

(51) Int. Cl.
*G06F 17/00* (2006.01)
(52) U.S. Cl. ............. 701/65; 701/51; 701/61; 701/93; 477/115; 477/175; 180/170

(58) Field of Classification Search .......... 701/36, 701/51, 56, 58, 61, 65, 93, 99; 477/46, 47, 477/115, 175; 180/170, 178, 179
See application file for complete search history.

(56) References Cited

U.S. PATENT DOCUMENTS

| | | | |
|---|---|---|---|
| 5,748,472 A * | 5/1998 | Gruhle et al. ............. | 701/51 |
| 6,219,607 B1 * | 4/2001 | Piepenbrink et al. .......... | 701/51 |
| 6,236,928 B1 | 5/2001 | Löffler et al. | |
| 6,339,749 B1 | 1/2002 | Rieker et al. | |
| 6,446,024 B1 | 9/2002 | Leimbach et al. | |
| 6,529,813 B1 * | 3/2003 | Henneken et al. ............. | 701/56 |

FOREIGN PATENT DOCUMENTS

| | | |
|---|---|---|
| DE | 33 34 716 A1 | 4/1985 |
| DE | 43 26 182 A1 | 2/1994 |
| DE | 196 00 734 A1 | 7/1997 |
| DE | 197 43 059 A1 | 4/1999 |
| DE | 102 35 969 A1 | 2/2004 |
| DE | 600 03 369 T2 | 5/2004 |
| DE | 102 60 007 A1 | 7/2004 |
| DE | 103 47 714 A1 | 5/2005 |
| EP | 0 377 953 A2 | 7/1990 |

(Continued)

*Primary Examiner* — Gertrude Arthur Jeanglaud
(74) *Attorney, Agent, or Firm* — Davis & Bujold, P.L.L.C.

(57) ABSTRACT

A method of influencing an automated transmission of a motor vehicle having a tractional resistance detection unit, the method comprising the steps of reading data, via the tractional resistance detection unit, containing at least information about a torque of a drivetrain, a rotational speed of the drive train, and an acceleration of the vehicle, determining the external tractional resistance of the vehicle based upon the read data, and influencing the shift program by at least one of activation, adaptation and variation of the shift program, on a basis one of an actual and a statistically prepared data about the external tractional resistance of the vehicle.

17 Claims, 1 Drawing Sheet

FOREIGN PATENT DOCUMENTS

| | | |
|---|---|---|
| EP | 0 503 948 A2 | 9/1992 |
| EP | 0 752 548 A2 | 1/1997 |
| EP | 0 925 486 | 6/1999 |
| EP | 0 932 033 A1 | 7/1999 |
| EP | 1 070 876 A1 | 1/2001 |
| EP | 1 158 220 A2 | 11/2001 |
| WO | WO 99/02947 | 1/1999 |
| WO | WO 02/055909 A1 | 7/2002 |

* cited by examiner

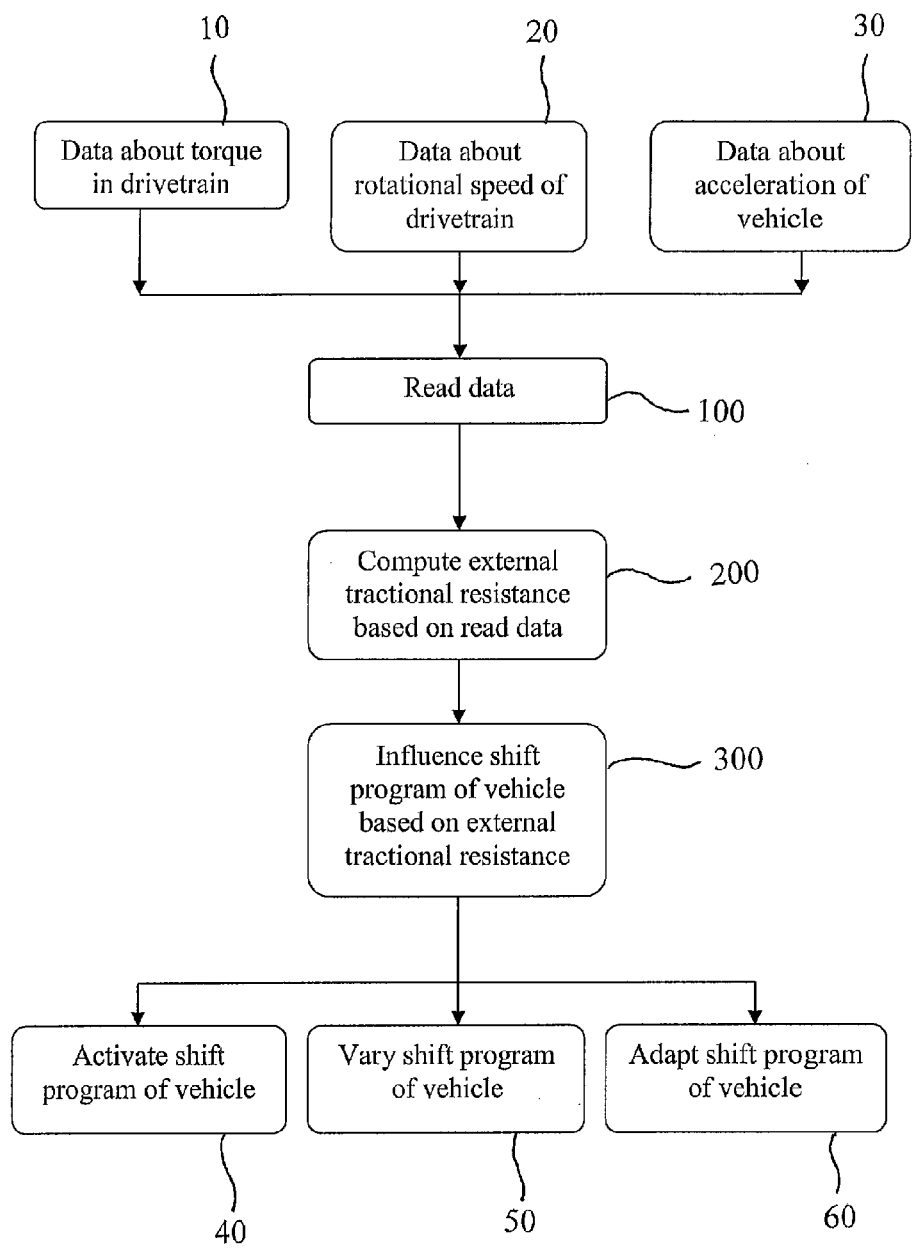

METHOD FOR INFLUENCING AN AUTOMATIC GEARBOX, TAKING INTO CONSIDERATION THE TRACTIONAL RESISTANCE

This application is a national stage completion of PCT/EP2006/009514 filed Sep. 30, 2006, which claims priority from German Application Ser. No. 10 2005 049 710.1 filed Oct. 18, 2005.

FIELD OF THE INVENTION

The invention relates to a method for influencing an automated gearbox taking into consideration the tractional resistance.

BACKGROUND OF THE INVENTION

For a considerably long time, automated transmissions have been used in different types of motor vehicles in the form of stepped and non-stepped or continuously variable transmissions. It is customary that, according to the operation point of the prime mover, such as the rotational speed, and the generated torque of the prime mover, an automated transmission determines the gear to be activated at the moment.

For better coordination of the transmission automatics, added parameters are partly used. By taking into consideration the temperature of the transmission and prime mover, it is possible to take into consideration increased inner friction, resulting from a cold engine and/or transmission oil and/or high rotational speeds of the prime mover, can be prevented by early shifting to a higher gear. When a driver's preference for an economical or sport driving style is determined or inquired, the switching points at which a change of gear or, in general, a change of the transmission reduction ratio is effected are changed so that at high or low engine rotational speeds, a call for a shift is initiated.

In the simplest case, the shifting points can be stored in the form of a table or characteristic field in an electronic building block of a control unit by which a target speed is coordinated with each operation point of the prime mover combined with the known driving speed of the vehicle, it is possible, when needed, to consider other parameters by increasing or reducing the values. To prevent a shift variation, the shifting points for changing to a higher gear and the shifting points for change to the previously activated lower gear are coordinated with different engine operation points.

Such transmission controls must be designed so that even on a steep uphill gradient and/or in a vehicle loaded to the admissible limit, the same as cold engine and transmission after a gear change, the prime mover can provide a strong enough torque to keep the vehicle speed constant at the selected transmission ratio and the given speed of the vehicle. Otherwise, after a shifting operation or a change of reduction ratio, an undesired delay of the vehicle would occur. Therefore, without taking into account other parameters, a transmission control has to be designed so that during acceleration of the vehicle, it is shifted to the next higher gear later. This results in an unnecessarily high fuel consumption, greater wear on the engine and transmission; the same as elevated noise emissions.

In order to guarantee reliable and comfortable operation of the vehicle, even on steep uphill gradients, and to reduce the effects of the disadvantages described, different known shift programs are provided for the automated transmission or the shift program are adapted or changed to satisfy the requirements on acceleration capacity, fuel consumption and noise emissions under different external conditions. In the simplest case, two shift programs can be available that are alternatively selectable by the driver where one is optimized for steep uphill gradients and the other for travel on level ground or in the downhill gradient. Other shift programs obviously can be designed and activated for driving in the downhill gradient or for different average or maximum uphill gradients. Of course, the added work load for the driver is problematic here because they, in addition, have to assess the zone in which the vehicle is driving and select a suitable shift program which, in the practice, as a rule, may be omitted or at least often leads to selection of a shift program that is not optimal.

DE 196 00 734 C2 discloses a method for controlling units and/or systems of a motor vehicle in which three essential kinds of data are distinguished as follows:

actual position determining data which is transmissible by way of telecommunication systems such as GPS data;

static data entrained in the vehicle in the form of digitalized road data, and data derived by the driver-vehicle system such as transverse acceleration, differences of rotational speed of the wheels, yawing angles and driving direction.

At least two of these kinds of data are converted to form a regulated variable for transmission control. With the aid of the actual data and the static data, it is particularly determined in what driving environment (city, country, expressway, level ground, uphill program) the vehicle is in and the shift program of a stepped or continuously variable automatic transmission of a motor vehicle is accordingly adapted and/or varied. In addition, other data can be used and/or other systems of the vehicle can be controlled.

This attachment makes an accurate and targeted influence of the switch points or of the shift program of an automatic transmission possible. For this, of course, at least actual position data is needed, for example, by way of a GPS system or digitized road maps entrained in the vehicle and preferably both kinds of data.

In the practical conversion, there are different problems concerning the electric and signal technology coupling of a GPS sensor with corresponding evaluation electronics and the wiring expenses related thereto and the need of carrying actual road maps of the area along on which the vehicle drives. It is true that navigational systems are increasingly developed in the vehicle and contain both kinds of data, but this is accompanied by a considerable expenses to ensure the compatibility of a transmission control with a great number of navigation systems existing on the market with different output formats and printouts. Moreover, a transmission control must also be fully capable of operating even without a working and active navigation system.

With this background, the problem on which the invention is based is to propose a method for influencing an automatic transmission, which is easy and does not require data exchange with devices outside the vehicle and independent of a digitalized road chart of the region on which the vehicle drives. At low construction expenses, it is possible to determine the amount of an external tractional resistance. Topographic information of the region must be obtained in which the vehicle drives which, if necessary, combines with other influencing variables, relative to the external tractional resistance of a tractional resistance detection unit, allows influencing the control of an automated transmission in a manner such that fuel consumption and the emission of pollutants and noises are reduced by moving the shifting points or selecting an adequate shift program. Moreover, the traveling comfort and the uphill gradient capacity of the vehicle are also to be improved.

BRIEF DESCRIPTION OF THE DRAWING

The invention will now be described, by way of example, with reference to the accompanying drawing in which the sole figure is a flow chart depicting one embodiment of a method for influencing an automatic gearbox, taking into consideration the tractional resistance according to the invention.

DETAILED DESCRIPTION OF THE INVENTION

The invention is based on the knowledge that the above mentioned objectives can be reached in an especially simple and an efficient manner when the external tractional resistance is easily determined from state data existing in the vehicle. Complex data related to navigation systems, position-determining systems and road map evaluation system, likewise, can be eliminated in this manner, as well as the need for use of specialized sensors.

Accordingly, the invention departs from a method for influencing an automated transmission of a motor vehicle in which a tractional resistance detection unit determines an external tractional resistance of the vehicle and, according to the external tractional resistance, influences a shift program by activation and/or adaptation and/or variation of the automated transmission.

Automated transmissions together with discrete reduction ratios are to be understood as transmissions, which make a continuously variable change of reduction ratio possible. The vehicle can be any engine-driven agricultural vehicle expressly including farm tractors or self-propelled working machines.

In the solution of the stated problem and shown in the figure, it is provided that in an initial step 100 the tractional resistance detection unit reads in data which contain at least information about an input torque of the drivetrain 10, and the accompanying rotational speed 20 and the acceleration of the vehicle 30.

For example, transmission ratio, axle ratio and wheel radius can also be included as data.

The information about the input torque to the drivetrain can be determined at any suitable position of the drivetrain, such as at a transmission or an axle shaft. The evaluation of the data of a control unit of the prime move of the vehicle, which is mostly already existing, is particularly easy with the help of calculation regulations or characteristic fields, makes it possible to accurately determine the torque of the prime mover abutting on the clutch plate.

Basically, it is unimportant for what position of the drivetrain the values of the input torque have been regulated. However, to assist in easily understanding the other embodiments, it is possible to define the driven axle or the driven wheels as a reference point and, based on the reference point, to gauge the determined values of the abutting torque and the rotational speed by way of the known geometric ratios. Therefore, for further explanations, the point of departure should be the input torque on the driven wheels, the total input torque obviously being meant in case of several driven wheels or axles.

The input power momentarily available in a position can be easily determined from the input torque in the drivetrain and the appertaining rotational speed. With the aid of data concerning the acceleration of the vehicle, which can be easily determined from the time curve of the vehicle speed, in a subsequent step 200, the tractional resistance detection unit concludes the external tractional resistance of the vehicle by simple calculations or tables.

By external travel resistance of the vehicle, it is understood in the first place as the sum of resistances which stand opposed to the advance of the vehicle from the point of reference for the input torque in the drivetrain.

Among others, resistances can be caused by air and rolling friction. Depending on the position of the reference point for the input torque in the drivetrain, drag torques by other components, units and modules of the vehicle can also be included in the external tractional resistances. Therefore, insofar as data already exists about torque and rotational speed of the drive axle, drag torques applied by air conditioning units, pumps or retarders are added to the internal resistances and need not be separately considered. But, when the input torque is determined from engine data of the prime mover, special consideration of the drag torques can be convenient. However, the most important external tractional resistance results from the uphill gradient of the road in which the vehicle drives and more precisely the combination of the uphill gradient, driving speed and total weight of the vehicle.

In a situation of constant speed, the sum of the internal and external tractional resistances equals the input power. If the latter exceeds the internal and external tractional resistances, the excess results in acceleration of the vehicle. In this way, the tractional resistance detection unit, departing from state data of the vehicle, already existing in the vehicle or easily determinable with usual sensors, can conclude about the uphill gradient of the distance in which the vehicle actually drives.

On the basis of the actual or statistically prepared data about the external tractional resistance of the vehicle, the tractional resistance detection unit can, in another step 300, thus influence the shift program of the automated transmission by activation 40, adaptation 50 and/or variation 60 in a manner such that, in an area with steep uphill gradients—and thus with a high external tractional resistance—a shift program is selected which has relatively high shifting points. That is, it shifts to the next higher gear only in case of relatively high rotational speeds of the engine.

On the other hand, when traveling in flat terrain, it is possible to activate or adequately vary a shift program, thus allowing an early gear change during an acceleration such that a considerable amount of fuel can be saved.

Within the scope of this invention, in the first place, it is unimportant whether the described adaptation of the shift program is carried out by selection from a number of different programs, tables or characteristics fields, or through evaluation by variable factors. Together with the described case of mere differentiation between travel on the mountain and on level ground, a multiplicity of more accurate or a continuous gradation can also be conceived. In another embodiment, differentiation can be made between driving on level ground, continuous uphill driving and driving in mountainous terrain with changing uphill and downhill gradients.

In the simplest case to be included in this invention, there can even exist only one shift program for control of the automated transmission insofar as the manufacturer or workshop, based on measurements determined with other vehicles in the above described manner, from a multiplicity of shift programs or parameter adjustments, selects an optimal shift program or an optimal parameter adjustment. To this extent, the values determined with one or a few vehicles can be transmitted to a vehicle fleet insofar as the single vehicle drives under the same or similar conditions, specially always in approximately similar grounds.

It is conceivable that from a fleet of urban line buses of nearly the same construction, only one bus be equipped as above described when the bus is used in every day operation on different lines to determine the optimal parameters for a shift program of a transmission control. The parameters can then be read out and transmitted to the transmission controls of the buses customarily used on the line.

Let it be pointed out here that with the means described, a great external tractional resistance is obviously to be attributed only hardly clearly to a steep uphill gradient. The data detected by a tractional resistance detection unit in a vehicle on a steep uphill gradient without trailer resemble a small uphill gradient with a heavy trailer and on level zone under a constant and very strong head wind and a housing trailer. By evaluating the curves of the external tractional resistance, of course, it is absolutely possible to differentiate at least partly between these situations, since a tractional resistance produced by a strong wind and great air resistance, as a rule, has along the time a markedly varying profile as result of squalls and regions sheltered from winds, while a considerable difference in the total weight of the vehicle, as a result, of the increased mass inertia, leads to a characteristic curve in acceleration operations. But more important than the undoubted explanation of the causes of external tractional resistance is that even without this, a convenient influencing of the shift program by the tractional resistance detection unit is possible. In all three examples mentioned above, an increase of the shifting points is applied.

While in a basic form of the invention, only the external tractional resistance is determined as total value, the tractional resistance detection unit determines, in a preferred embodiment of the invention, the external tractional resistance taking into consideration additional parameters whereby not only a still more accurate adaptation of the influence of the automated transmission is possible, but the topographical properties of the terrain driven over can also be more precisely determined.

It is of special advantage if the tractional resistance detection unit determines the external tractional resistance, taking into consideration the rolling resistance of the vehicle. Since the rolling resistance, along the time and range of action, is mostly constant to a great extent or after a time constant profile depends on the driving speed and eventually added factors, in this way it is possible to improve the accuracy in determining the uphill gradient of the road surface. In the simplest case, it is possible to link a constant value and a constant factor with the driving speed and to remove the rolling resistance thus determined by easy conversion of the input torque to the reference point. The rolling resistance is thus converted by simple calculation to a known parameter which, in the future, need not be taken into further consideration.

At constant speed and level terrain, there are obviously possible many more exact and complicated methods for calculating or measuring the rolling resistance and the inclusion of a multiplicity of other parameters like air pressure, road surface, tire model and temperature or the determination of a profile on each vehicle, such as at constant speed on level terrain.

The same applies when taking the air resistance of the vehicle into consideration when determining the external tractional resistance by the tractional resistance detection unit. The air resistance depends primarily on the vehicle speed, the working surface and the air resistance co-efficient (CW co-efficient) of the vehicle and can be easily evaluated and can also be converted to a known variable, similar to the above stated. Any precise and/or complex methods for determining the air resistance are obviously possible here. In case of low speeds, the air resistance can also remain completely ignored without obtaining a greater calculation error.

Moreover, the external tractional resistance depends to a certain degree on the mass or weight of the vehicle. On one hand, as the weight increases the rolling resistance grows, it is optionally possible to include this effect already when taken into consideration. On the other hand, when driving over an uphill gradient, a heavy vehicle acquires more potential energy. Besides, the inert mass of the vehicle takes effect during acceleration operations which breaks down under similar conditions with a low acceleration or acceleration capacity on the slope or in a great tractional resistance caused by the uphill gradient. Due to the various assumptions of influence of the total weight of the vehicle, it is of special advantage to take the vehicle mass into consideration when determining the external tractional resistance.

This is especially easily possible in passenger motor vehicles and buses, because of the relatively high portion of the operative vehicle in total weight, the oscillations produced by changing load or changing number of occupants are relatively small. Therefore the tractional resistance detection unit preferably can determine the external tractional resistance by taking an assumed medium total weight of the vehicle into consideration, which can be approximately determined, for example, from the sum of the dead weight plus half the admissible service load or by the equation dead weight plus admissible total weight by two. Naturally, an evaluation of the medium service load with the aid of statistical data with regard to the utilization of individual bus lines is also conceivable.

Still more precise results are obtained if the tractional resistance detection unit determines the external tractional resistance, taking into consideration the real total weight of the vehicle.

As already stated, the external tractional resistance of the vehicle is here understood in the first place, as the sum of the resistances that stand opposed to the advance of the vehicle from the reference point for the input torque in the drivetrain. Since mostly it is especially easy to use the data already existing in an engine control unit of the prime mover, the reference point without other corrections lies in this case on the output shaft of the engine. It is naturally important for the selection or variation of a shift program for an automatic transmission whether the prime mover at the same time also transmits a considerable amount of power to driveable pumps, air conditioning installations, retarders or other elements, components or units, since these reduce the power available for propulsion of the vehicle. More accurate results relative to the uphill gradient of a distance driven over, can be obtained when the tractional resistance detection unit determines the external tractional resistance, taking into consideration internal resistances which reduce an input torque actually abutting on the wheels of the vehicle compared to the input torque to be expected as a result of the information read concerning the input torque in the drivetrain.

When the tractional resistance detecting unit takes into consideration a reduction produced by additional units of the drive torque actually abutting on the wheels of the vehicle, this has the added advantage that temporary differences in the power absorption of the added units can be detected separately from the remaining drop of power.

Briefly expressed, if this is not taken into consideration, a jump of a high power air conditioning unit leads the tractional resistance detection unit to the conclusion of a considerable increase of the external tractional resistances and, for example, modifies the shift program so that only at relatively high rotational speeds is a shift to the next gear initiated. By taking into consideration the added unit air conditioning equipment, according to the above embodiments, the tractional resistance detection unit establishes, on the other hand, an interruption of the power that is made available or can be made available by the prime mover under unchanged external tractional resistance. The effects upon the shift program can be identical in an adequate construction of the tractional resistance detection unit. However, the variable of the external tractional resistance, determined by the tractional resistance detection unit in a separate detection, to a great extent more precisely corresponds to the uphill gradient and is thus considerably closely linked with the actual topography of the area driven over.

If the tractional resistance detection unit alternatively or additionally takes into consideration the reduction produced by an automatic or manual brake engagement of the input torque actually abutting on the wheels of the vehicle, a specially accurate pattern results corresponding to the topography for influencing the shift program.

It is fundamentally to be kept in mind that merely a torque absorption of the external tractional resistance, covering an extremely short time, is only of very limited affirmation force inasmuch as it is not practicable to alter or change the shift program of the automated transmission in the space of a few seconds or even tenths of second. Besides, during a too brief observation of singular events, such as strong starting torque of a unit or a yaw caused by strong wind, can make themselves strongly noticeable. On the other hand, the whole system must react quickly enough so as, for example, in a drive from a level terrain to a mountain, not to shift on the first steep uphill gradient to an inadequate gear in a drive from a level terrain to a mountain or, in the opposite case, not to drive unnecessarily for a long time in the plane in a mode in which an upshift operation is introduced relatively late.

Therefore, it is provided that the tractional resistance detection unit comprises an averaging module which evaluates the actual values of the tractional resistance over a predetermined time and determines a medium tractional resistance. The kind and construction of the averaging module can be of different manners. A unit of time can determine both the individual input values of the tractional resistance detection unit and the result of the external tractional resistance. Moreover, it is possible to average over time periods of different lengths and different weight.

An especially easy solution results, particularly in case of analogous input values when the averaging module determines the mean tractional resistance by time filtering of the actual values of the tractional resistance or the basic input data thereof.

An especially good averaging module adaptable to different marginal conditions is obtained, on the other hand, when the mean tractional resistance, or also the basic input data thereof, is determined by grading the actual values of the tractional resistance or of the input data by way of mathematical-statistical methods.

It is of a particular advantage if the averaging module has at least two alternative possibilities available for determining the mean tractional resistance, therebeing in addition provided a selector element which, from the alternative possibilities, selects one by manual or automatic actuation. It is thus possible, for example, alternatively to provide two different time constants of which a short time constant serves for a quick and accurate adaptation of the shift program, even under quickly changing conditions, while a long time constant effects a gradual adaptation of the shift program thus preventing undesired oscillations in the shifting behavior.

It is enough in most cases, for example, via a switch or pushbutton on the dashboard, if the driver is given one possibility of selection that allows him, when driving over a steep ramp or at the foot of a steep mountain pass, by actuation of the switch or pushbutton, to take care of a quick adaptation of the shift program to the actual conditions while, otherwise he essentially perceives no changes in shifting behavior since the changes have been conducted very slowly.

The method proposed before can be used for different purposes and ends. The tractional resistance detection unit can especially influence the shift program on the basis of the actual or the mean tractional resistance in a manner such that at least one shifting point is raised for an upshift operation with increasing external tractional resistance. This corresponds, in the case of steep uphill gradients in mountainous areas with an extreme head wind and/or considerable trailer load, to the object of modifying the shift program so that the individual gears be kept longer, that is, shifted later to the next higher gear.

Another convenient application results when the tractional resistance detection unit, when it is at least fully loaded the prime mover assesses or calculates, singly or additionally, for the next higher gear the input torque available after an upshift and engages the gears lying above the actual gear when, after a shift to a higher gear under conditions that otherwise remain the same, this would not be enough to sufficiently accelerate the vehicle.

This assessment, with the basis of the already introduced definitions of the method, is to be easily obtained by the fact that the previously known differences in ratio are used in a gear change to determine, on the basis of otherwise similar conditions, the engine rotational speed abutting after a gear change and the resulting engine torque. By way of the additional values, the tractional resistance detection unit can easily assess whether the prime mover, after a corresponding gear shift, would be able to further accelerate the vehicle. A shift oscillation felt by the driver as an unpleasant shifting error can thus be reliably prevented.

Other parameters obviously can also be taken into consideration here. The motion of the accelerator pedal can be monitored in order to detect if the driver has changed, with desired acceleration, from full load range to a driving range in which he wishes only to maintain the speed. It can also be taken into consideration, according to the position of a reference point, that there are certain reductions of power before or behind the transmission and accordingly react to different extents to a change of gear with a changed power absorption.

The range of operation of the prime mover is here defined as full load range depends, to a great extent, on the characteristic lines of the engine. The full load range for the object considered, in a first approximation is regarded as a power range from 85% of the maximum power of the engine at the rotational speed of the prime mover that actually exists or appears after a gear shift.

Finally, the tractional resistance detection unit, on the basis of the tractional resistance determined and particularly on the basis of a determined uphill gradient of the road surface, from a firmly preset or adaptable first threshold can set in and out of operation certain functionalities of the transmission, such as an NBS (neutral in stoppage) switch of the transmission control and below a preset or adapted second threshold can again set them in and out of operation. It obviously is here convenient if the first threshold for setting out of operation the NBS switch represents a sharper uphill gradient or a greater tractional resistance than the second threshold for resetting the operation.

At this point, the need of a separate interpretation or determination of the influence of the uphill gradient and other influence variables becomes especially clear, since the existence of a loaded trailer, for example on level ground, does not need setting out of power of the neutral switch during stoppage, but a sharp uphill gradient, on the other hand, can easily result in a rearward rolling of the vehicle.

When necessary, the thresholds for connection and disconnection of the NBS switch can be selected by the driver by way of a potentiometer or other input means. For example, during parking operations on small uphill gradients, experienced drivers can consciously work with the rolling back of the vehicle while inexperienced drivers can reliably prevent a rolling back. Let it be finally observed that within the scope of this invention, it obviously makes no difference whether the NBS function is integrated in the tractional resistance detection unit, is part of the transmission control or is an independent module.

The invention can further be explained with the aid of an embodiment:

According to the invention, as a passenger motor vehicle equipped with an automated transmission drives on level ground and nears the foot of a mountain, the tractional resistance detection unit steadily receives control data from the engine concerning rotational speed and torque of the prime mover, the same as the speed of the vehicle. With the aid of other known variables, such as an actually actuated gear and a tabularly registered temperature-related evaluation of frictional losses between the output shaft of the prime mover and the driven wheels, the tractional resistance detection unit converts the values to an imaginary reference point on the driven wheels of the vehicle. At the same time, a signal is also evaluated regarding the operation state of the air conditioning equipment thus precisely determining the tractional force available on the wheels. The tractional resistance detection unit then reads the vehicle speed and determines the acceleration of the vehicle therefrom.

From the time profile of the tractional force determined on the wheels and the known time profiles of the vehicle speed and vehicle acceleration, the tractional resistance detection unit detects that the vehicle is loaded up to its maximum admissible total weight.

The rolling resistance is assessed, via a simple look-up table, depending on the load and speed and is separately determined. Based on the above mentioned known data, the tractional resistance detection unit is able to precisely arrive at a conclusion about the surface on which the vehicle is driving from the acceleration behavior of the vehicle, without there being needed for this to determine the position of the vehicle, separate inclination sensors or road map information.

As the surface upon which the vehicle is driving becomes slowly steeper, the tractional resistance detection unit establishes an increase of the external tractional resistance and by way of a relatively slow adaptation process with increasing time in slightly rising terrain, the transmission control adapts so that the individual gears are extended to higher rotational speeds in acceleration operations. The adaptation operation takes place almost unnoticed by the driver.

At the foot of a first steep uphill gradient, the vehicle shifts, at a certain speed, to the next higher gear, but the driver senses the possible acceleration in this gear as insufficient. Therefore, he actuates a button on the dashboard, which sets the time constants of the tractional resistance detection unit for adaptation of the shift program to a clearly lower value thus taking care of a quick adaptation of the shift program to the now steep uphill gradient.

Besides, the tractional resistance detection unit, under travel conditions in the full load range, i.e., from 85% of the possible power delivery of the prime mover calculated on the existing engine rotational speed, continuously controls the possible power to be delivered or can be made available to the wheels of the prime mover in the next higher speed. This is possible with enough accuracy by way of the known reduction ratios of the transmission and of the known speed of the vehicle by simply reading out from a characteristic field. As long as after a gear change, the possible acceleration is below the momentary acceleration, the tractional resistance detection unit prevents a change to a higher gear.

Finally, the tractional resistance detection unit for that period of time in which an uphill gradient of the road of more than 5% is determined disconnects a module which, when the vehicle is stopped, normally ensures that the transmission is shifted to its neutral position.

The invention claimed is:

1. A method of influencing an automated transmission of a motor vehicle having a tractional resistance detection unit, the method comprising the steps of:
reading data, via the tractional resistance detection unit, containing at least information about a torque of a drivetrain, a rotational speed of the drive train, and an acceleration of the vehicle,
determining an external tractional resistance of the vehicle based upon the read data, and
influencing a shift program of the automated transmission by at least one of activation, adaptation and variation of the shift program, on a basis of one of an actual and a statistically prepared data about the external tractional resistance of the vehicle.

2. The method according claim 1, further comprising the step of determining the external tractional resistance with the tractional resistance detection unit by taking into consideration additional parameters.

3. The method according claim 2, further comprising the step of determining the external tractional resistance with the tractional resistance detection unit by taking a rolling resistance of the vehicle into consideration.

4. The method according claim 2, further comprising the step of determining the external tractional resistance with the tractional resistance detection unit by taking an air resistance of the vehicle into consideration.

5. The method according claim 2, further comprising the step of determining the external tractional resistance with the tractional resistance detection unit by taking a real total weight of the vehicle into consideration.

6. The method according claim 2, further comprising the step of determining the external tractional resistance with the tractional resistance detection unit by taking into consideration internal resistances which reduce an input torque actually abutting on wheels of the vehicle compared to an expected input torque based on information read about the torque of the drivetrain.

7. The method according claim 6, further comprising the step of considering, with the tractional resistance detection unit, a reduction of the input torque actually abutting on the wheels of the vehicle and produced by operation of additional units, 8. The method according claim 6, further comprising the step of considering, with the tractional resistance detection unit, a reduction of the input torque actually abutting on the wheels of the vehicle and produced by at least one of automatic and manual brake engagement.

9. The method according claim 1, further comprising the step of delivering, with one averaging module of the tractional resistance detection unit, actual tractional resistance values over a predetermined time and determining a medium tractional resistance.

10. The method according claim 9, further comprising the step of determining, with the averaging module, the medium tractional resistance by a timed filtering of the actual tractional resistance values.

11. The method according claim 9, further comprising the step of determining, with the averaging module, the medium tractional resistance by grading the actual tractional resistance values using mathematical-statistic methods.

12. The method according claim 9, further comprising the step of determining the medium tractional resistance with the averaging module using at least two alternative possibilities and selecting one of the alternative possibilities by one of manual and automatic actuation with a selector element.

13. The method according claim 1, further comprising the step of influencing the shift program with the tractional resistance detection unit, based on one of an actual and a medium tractional resistance, such that at least one shifting point is lifted for an upshift operation with increasing the external tractional resistance.

14. The method according claim 1, further comprising the step of determining an input torque available in the drivetrain, after an upshift, for a next higher gear with the tractional resistance detection unit, at least in a full load range of a prime mover, and locking gears above an actual gear with the tractional resistance detection unit when after a change to a higher gear under conditions otherwise remaining the same, locking the gears above the actual gear would not be enough for sufficient acceleration of the vehicle.

15. The method according claim 1, further comprising the step of setting out of operation an NBS (neutral during stoppage) switch of the transmission control with the tractional resistance detection unit on a basis of the external tractional resistance determined and on the basis of a determined uphill gradient of a surface on which the vehicle is driving, from one of a predetermined or adaptable first threshold and resets the NBS (neutral during stoppage) switch in operation when the external tractional resistance determined is below one of a preset and adapted second threshold.

16. A method controlling an automated transmission of a motor vehicle having a tractional resistance detection unit, the method comprising the steps of:
 receiving data in the tractional resistance detection unit concerning at least one of torque of a drivetrain, a rotational speed of the drivetrain and acceleration of the vehicle and data about input torque of the drivetrain;
 determining an external tractional resistance of the vehicle; and
 influencing a shift program of the automatic transmission by at least one of activating, adapting and varying the shift program of the automated transmission on a basis of one of an actual prepared data and a statistically prepared data about the external tractional resistance of the vehicle.

17. The method according claim 16, further comprising the step of determining the external tractional resistance of the vehicle with the tractional resistance detection unit by taking a real total weight of the vehicle into consideration.

* * * * *